United States Patent
Jin et al.

(10) Patent No.: US 7,576,815 B2
(45) Date of Patent: Aug. 18, 2009

(54) METHOD AND APPARATUS OF LIQUID-CRYSTAL-ON-SILICON ASSEMBLY

(75) Inventors: Haiming Jin, Cupertino, CA (US); George Chen, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 11/482,906

(22) Filed: Jul. 10, 2006

(65) Prior Publication Data
US 2008/0007682 A1 Jan. 10, 2008

(51) Int. Cl.
G02F 1/1335 (2006.01)

(52) U.S. Cl. ...... 349/113; 349/139

(58) Field of Classification Search ...... 385/39, 385/146; 345/88; 349/123; 359/618, 649
See application file for complete search history.

(56) References Cited

U.S. PATENT DOCUMENTS

| | | | |
|---|---|---|---|
| 4,150,876 A * | 4/1979 | Yevick | 349/25 |
| 4,678,542 A | 7/1987 | Boer et al. | |
| 4,999,619 A | 3/1991 | Te Velde | |
| 5,076,670 A * | 12/1991 | Sayyah | 349/27 |
| 5,309,264 A * | 5/1994 | Lien et al. | 349/143 |
| 5,338,240 A | 8/1994 | Kim | |
| 5,420,708 A * | 5/1995 | Yokoyama et al. | 349/149 |
| 5,446,562 A | 8/1995 | Sato | |
| 5,625,738 A * | 4/1997 | Magarill | 385/146 |
| 5,739,890 A * | 4/1998 | Uda et al. | 349/156 |
| 5,742,371 A * | 4/1998 | Izumi | 349/139 |
| 5,748,266 A * | 5/1998 | Kodate | 349/39 |
| 5,854,662 A * | 12/1998 | Yuyama et al. | 348/790 |
| 5,982,472 A * | 11/1999 | Moore | 349/156 |
| 6,008,876 A * | 12/1999 | Moore | 349/139 |
| 6,020,946 A * | 2/2000 | Callegari et al. | 349/124 |
| 6,061,114 A * | 5/2000 | Callegari et al. | 349/125 |
| 6,172,816 B1 * | 1/2001 | Tadic-Galeb et al. | 359/649 |
| 6,208,392 B1 * | 3/2001 | Miller et al. | 349/84 |
| 6,275,279 B1 * | 8/2001 | Asuma et al. | 349/153 |
| 6,292,246 B1 * | 9/2001 | Shinohara et al. | 349/143 |
| 6,567,217 B1 * | 5/2003 | Kowarz et al. | 359/618 |
| 6,614,502 B2 * | 9/2003 | Shinohara et al. | 349/187 |
| 6,690,444 B1 * | 2/2004 | Wilkinson et al. | 349/153 |
| 6,762,873 B1 * | 7/2004 | Coker et al. | 359/290 |
| 6,864,944 B1 * | 3/2005 | Scattergood et al. | 349/156 |
| 6,885,357 B2 * | 4/2005 | Mi | 345/94 |

(Continued)

FOREIGN PATENT DOCUMENTS

JP 11281971 A * 10/1999

(Continued)

*Primary Examiner*—Frank G Font
*Assistant Examiner*—Peter Radkowski
(74) *Attorney, Agent, or Firm*—KED & Associates LLP

(57) ABSTRACT

A liquid-crystal-on-silicon device generates an image for projection onto a screen. The device includes a front plane, a back plane including a pixel driving circuit, and a wall that forms a chamber between the front and back planes for holding liquid crystal. Electrodes protrude into the chamber from the front plane, back plane, or both, in a predetermined pattern. The electrodes may be shaped as pillars and may serve as anodes or cathodes or both. When a voltage is applied to the electrodes, the liquid crystal assumes different polarization states at different pixel sites to form an image which may be projected onto a screen.

40 Claims, 13 Drawing Sheets

U.S. PATENT DOCUMENTS

| | | | |
|---|---|---|---|
| 7,020,379 B2 * | 3/2006 | Lee | 385/39 |
| 7,126,156 B2 * | 10/2006 | Yamazaki et al. | 257/59 |
| 7,317,438 B2 * | 1/2008 | Yamazaki et al. | 345/88 |
| 7,365,897 B2 * | 4/2008 | Hagood et al. | 359/290 |
| 2001/0030725 A1 * | 10/2001 | Shinohara et al. | 349/113 |
| 2002/0001056 A1 * | 1/2002 | Sandberg et al. | 349/123 |
| 2002/0030437 A1 * | 3/2002 | Shimizu et al. | 313/495 |
| 2002/0131003 A1 * | 9/2002 | Matsumoto | 349/139 |
| 2003/0025842 A1 * | 2/2003 | Saccomanno | 348/758 |
| 2004/0190573 A1 * | 9/2004 | Kruschwitz et al. | 372/39 |
| 2006/0043857 A1 * | 3/2006 | Kim et al. | 313/234 |
| 2007/0242719 A1 * | 10/2007 | Spoonhower et al. | 372/50.124 |
| 2007/0273812 A1 * | 11/2007 | Bone et al. | 349/113 |

FOREIGN PATENT DOCUMENTS

JP   2000284316 A  * 10/2000

* cited by examiner

METHOD AND APPARATUS OF LIQUID-CRYSTAL-ON-SILICON ASSEMBLY

FIELD

The present invention relates in at least some of its embodiments to display devices.

BACKGROUND

A wide variety of electronic devices are designed with displays to meet consumer demands. In some instances, the displays play a supporting role in enhancing functionality. These displays are typically found in mobile phones, music players, and cameras. In other instances, the displays are the primary feature. These displays are included in televisions, computers, and projection systems.

One display technology that has demonstrated superior performance is liquid-crystal-on-silicon (LCOS). An LCOS display generates gray scale images based on the varying reflectance that results from field-controlled polarization of liquid crystal. These displays tend to be low-power, high-resolution devices that can be manufactured at relatively low cost and in many sizes. They are also structurally different from other liquid crystal display (LCD) technologies. For example, thin-film-transistor (TFT) LCDs use glass back planes and back-side light sources, whereas LCOS displays use silicon back planes and front-side light sources. As a result, LCOS displays can be integrated into standard semiconductor processes, which is attractive from a manufacturing standpoint.

FIG. 1 shows, in cross-section, an example of a LCOS device for generating images in a display system. The device includes a ceramic bottom plate 1, a silicon back plane 2 on the ceramic plate, and a glass front plane 6 arranged over and in parallel with the back plane. The device also includes a liquid crystal layer 4 between the front and back planes. Pixels are activated by electrodes 3 and 5 disposed below and above the liquid crystal layer. The lower electrode (nearest the back plane) has a mirrored surface for reflecting light from a front-side light source.

Although LCOS devices such as shown in FIG. 1 are widely available, they have proven unsatisfactory in terms of their ability to achieve high-yield production with reliable results. Moreover, significant challenges exist in the area of silicon and liquid crystal material joint assembly.

DETAILED DESCRIPTION

Figure 1:
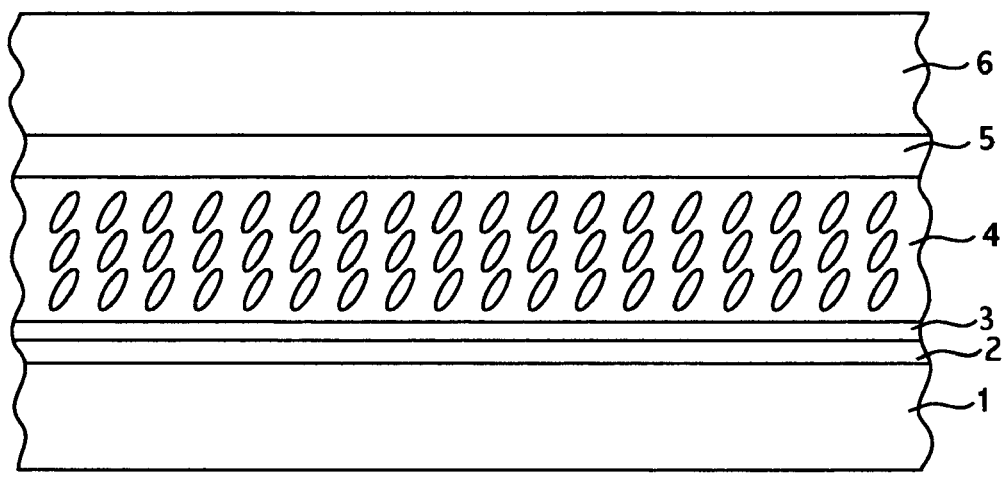
FIG. 1 is a cross-sectional diagram of a LCOS device.
Figure 2:
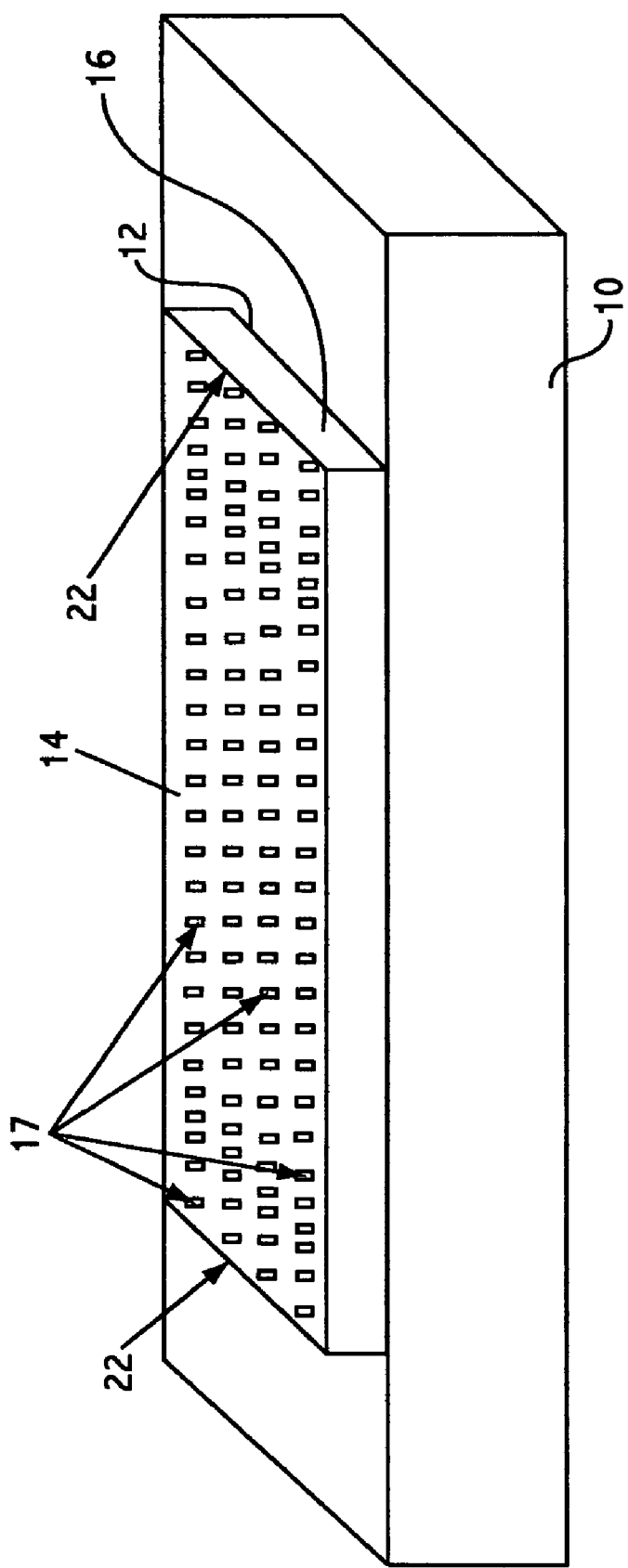
FIG. 2 is a diagram showing an LCOS device in accordance with a first embodiment of the present invention.

FIG. 2 shows a LCOS device for generating images in a display system according to a first embodiment of the present invention. The device includes a bottom plate 10, a back plane 12, and a front plane 14 spaced from and in parallel with the back plane. The bottom plate 10 may be made of ceramic or another material, and may be finely planarized to reduce or eliminate bumps, irregularities, or surface artifacts which, when magnified by an optical projection system, degrades image quality.

The back plane is made of silicon or another semiconductor material. The back plane may include a pixel driving circuit as well as control circuitry for the liquid crystal. The pixel driving circuit may include a number of pixel driving electrodes that correspond to the number of pixels driven by one section of or an entire display incorporating the device. In other arrangements, the numbers of driving electrodes and pixels may be different.

In addition to these features, the back plane may include a plurality of cathode electrodes arranged in a predetermined pattern or matrix. The cathode electrodes may correspond to pixels in the display, and may operate in conjunction with the anode electrodes to modulate the liquid crystal material at each pixel location during image generation. In at least one embodiment, the cathode electrodes may also serve as alternating ground/power supplies to the front plane during LCOS operation. Each pixel may have a pitch of 3-9 um and the inter-pixel spacing may be 0.12-0.35 um. The pitch and spacing may be different in other embodiments.

In terms of structure, the cathode electrodes may protrude from a surface of the back plane. In one non-limiting application involving a micro-display, the electrodes may protrude a predetermined distance, such as 0.5-2.0 um, above the upper-most process layer of the back plane. This distance may be based on a cell gap, such as 0.25-1.0 um, in the display. The 3-sigma variation in cell gap may be +/−2% to +/−6%. While these values may be suitable for some applications, the protrusion distance, cell gap, and/or 3-sigma variation may be different in other applications or embodiments.

In addition to these features, the protrusions formed by the electrodes may be shaped as pillars 17 to stabilize the assembled layers of the device. The pillars may have a polygonal, rectangular, circular, or other cross-section and may have a core that is solid or hollow. Additionally, the pillars may serve as spacers for defining a cell gap between the front and back planes, may be made of a conductive material such as aluminum or tungsten, and may have a certain size or shape to meet the requirements of a given application.

In terms of fabrication, the pillar electrodes 17 may be formed using a semiconductor process similar to one used to fabricate via interconnects. However, unlike vias which are sandwiched between two metal layers, the pillar electrodes may be formed without using a top metal layer. This process involves forming holes in a supporting material layer, filling the holes with conductive material, and then forming a nonconductive layer on top of the conductive material. The nonconductive layer is then planarized (e.g., by etching) and surface polished using a chemical-mechanical polishing process, leaving conductive pillar electrodes. The electrodes may be formed to provide electrical connectivity and mechanical support either on the back plane or on a surface of a front plane as will be discussed in connection with an alternative embodiment.

In addition to providing mechanical support, the pillar electrodes 17 help to maintain the front and back planes flat and parallel with one another. This improves performance of the resulting image. To preserve image quality and to maintain a uniform and consistent cell gap, it would be beneficial to improve flatness and parallelism among the layers of the device, including from the ceramic bottom plate to the front plane. In accordance with the present embodiment, this may be achieved by providing the cathode electrodes across an active area of the back plane at the same, or substantially the same, height in a predetermined pattern. This pattern may be a uniform pattern where each cathode electrode corresponds to one or more pixels. In other embodiments, an irregular pattern may be used.

Figure 3:
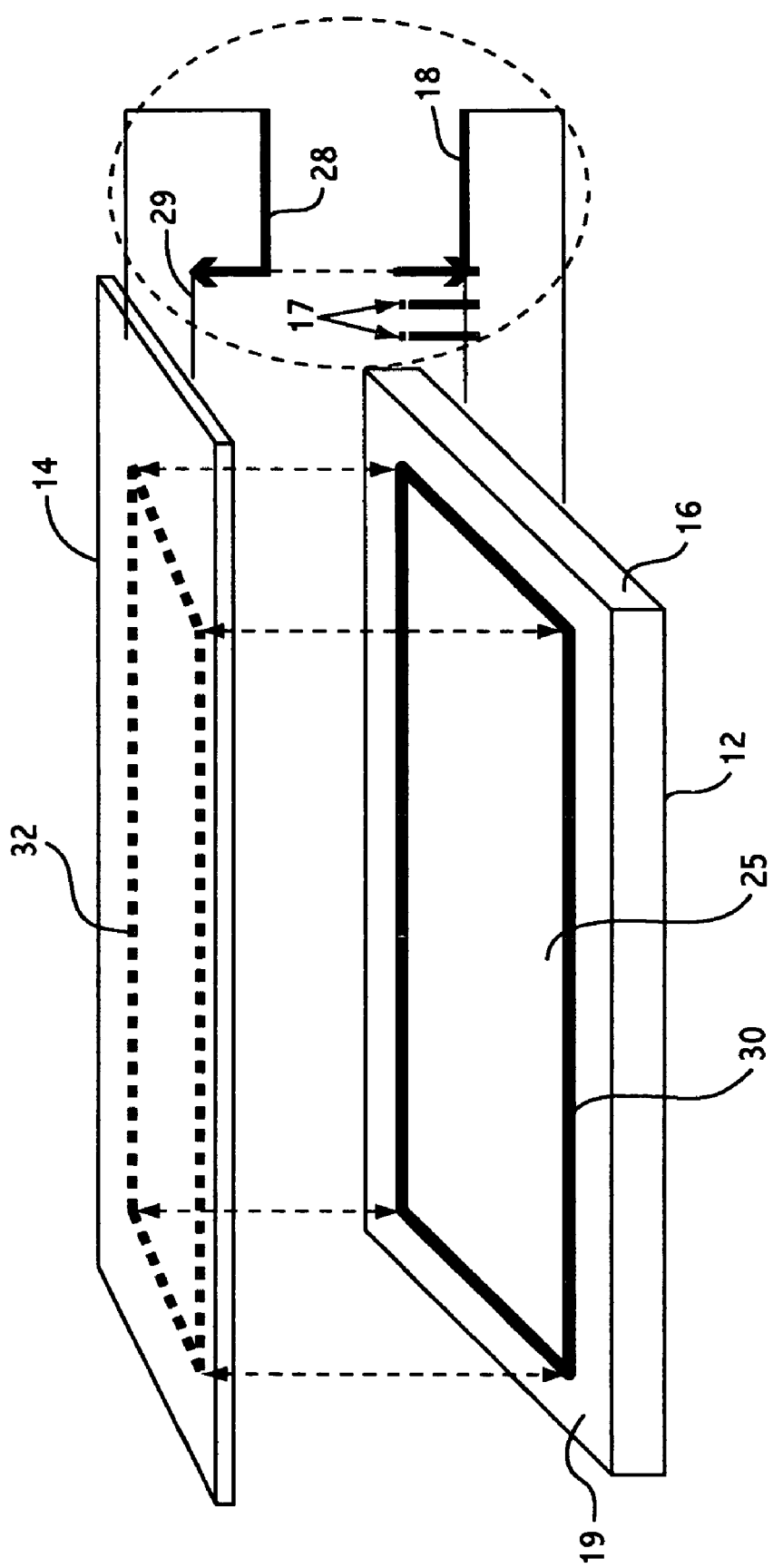
FIG. 3 is a diagram showing another view of the LCOS device in accordance with the first embodiment of the present invention.

The front plane is made of a transparent material such as glass or quartz. As shown in FIG. 3, an interior surface of this plane may be coated with a transparent electrically conductive material such as Indium-Tin-Oxide (ITO). The optical properties of the ITO should be matched with the optical properties of the front plane. The ITO layer may drive the polarization of the liquid crystal and increase conductivity across the front plane. Also, in this embodiment, one end of each cathode electrode may be connected to a voltage driver circuit in the back plane, and the other end may be connected to the ITO layer.

Figure 4:
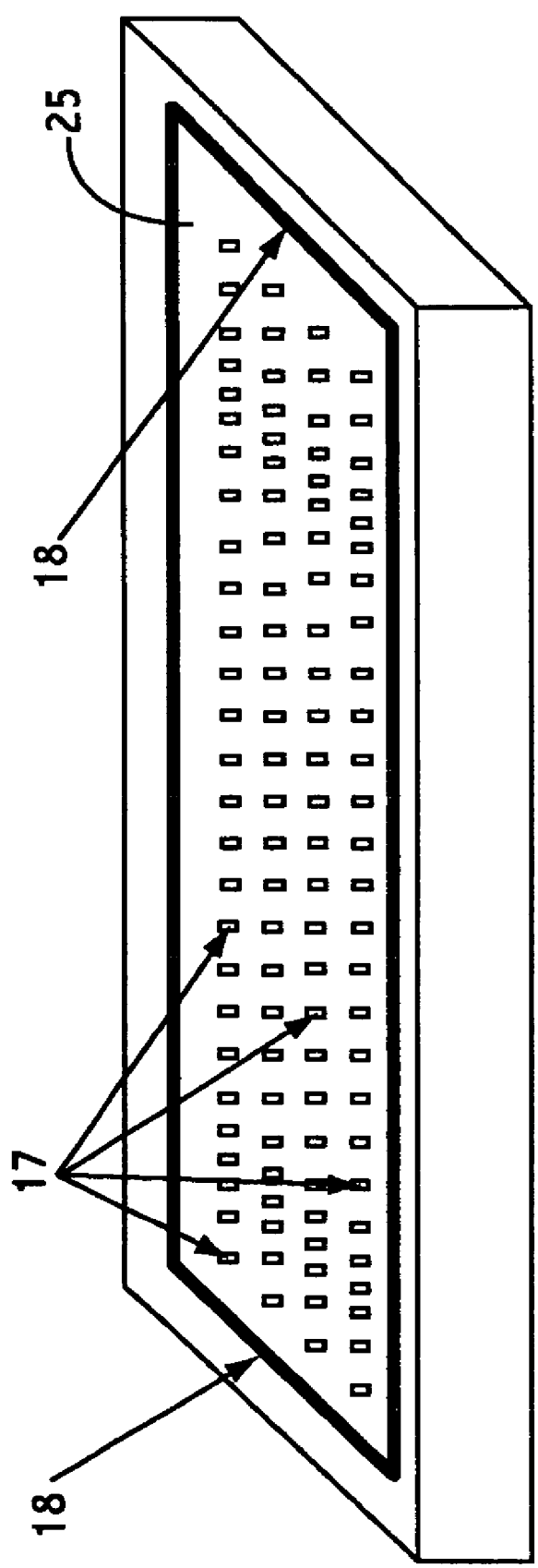
FIG. 4 is a diagram showing another view of the LCOS device in accordance with the first embodiment of the present invention.

In order to create a cavity or chamber for retaining liquid crystal, a wall 16 is formed around the periphery of the front and back planes to enclose the space therebetween. The wall may be made of aluminum or another material and is attached to the front and back planes by a bonding adhesion layer 18, as shown in FIGS. 3 and 4. To ensure that the liquid crystal remains in the chamber without leakage, the adhesion layer may include a sealant material which is applied at joints where the top and bottom of the wall contact adjacent portions of the front and back planes. The sealant material may be organic or inorganic. Polyimide is an example of an organic material that may be used to form layer 18 and polysilicon is an example of an inorganic material. An additional chamber seal 22 may also be applied to the joints of the LCOS device as shown in FIG. 2. Polysilicon or another material may be used for this purpose. Polysilicon may be suitable for some applications because it is able to form a hermetic seal.

From a structural standpoint, the peripheral wall imparts rigidity to the LCOS device which complements the stability provided by the internal cathode electrodes. To reduce reflection of ambient light, an anti-reflective coating 19 may be formed on certain interior portions of wall 16 but not on other interior portions. This coating may be made from titanium nitride (TiN) or other material capable of reducing light reflection. Light reflection may be reduced by absorption or destructive interference.

During formation of the chamber, the wall is attached to the silicon back plane along a glue line 30 as shown, for example, in FIGS. 3 and 4. The back plane and wall are then immersed or submerged to fill the chamber with liquid crystal 25. The immersion or submersion may be performed so that liquid crystal spills into the chamber from all sides at once, or the chamber may be tilted to allow the liquid crystal to enter from only one side. Once immersed or submerged, the liquid crystal flows around each of the cathode electrodes until the chamber is filled to a predetermined depth. This depth may result in covering wall 16 entirely or may result in filling the chamber to any other lower or higher level. Various types of liquid crystal may be used to form the LC layer of the LCOS device.

One type of LC material that may be used is nematic liquid crystal. This material is able to modulate the polarization of light passing through it when a voltage, such as 0.5-8 volts, is applied. More specifically, when an electric field is applied (e.g., based on voltage signals coupled to the cathode electrodes), the molecules in the liquid crystal align themselves relative to the electric field. This causes the polarization of light passing through the liquid crystal to rotate in a way that causes reflection, when the light source is located in front of the LCOS device. The LCOS may be operated in a binary (on/off switching) mode. Pulse width modulation may be used. Gray scale levels of light are emitted on a per pixel basis to form an image which is projected onto a screen. In the absence of an electric field, nematic liquid crystal assumes an inactive state where incident light is passed or transmitted.

In some embodiments, the response speed of LCOS may be 2-8 milliseconds at room temperature. The response speed may be faster, such as 0.1-0.4 milliseconds, for example, when temperature is increased or when the cell gap is reduced. The response speed may be enhanced at the expense of efficiency.

Also, in some embodiments, device throughput efficiency may be about 65-75%. In other embodiments, throughput efficiency may be different. The efficiency may depend on reflectivity, fill factor (pixel-to-aperture ratio), diffusion loss, and/or timing. As an example, the reflectivity may be 67-77% and the fill factor may be 92-97%. The efficiency and contrast may be enhanced by pre-polarizing the light source output and/or by using a polarization recovery scheme. LCOS may use a short-arc, such as less than 1 millimeter, high-pressure lamp as a light source.

By filling the chamber with nematic material, a type of LCOS device known as a twisted nematic (TN) may be formed and applied to various applications including microdisplays, computer screens, and televisions. In other embodiments, a different type of liquid crystal may be used such as polymer liquid crystal (PLC), polymer-dispersed liquid crystal (PDLC), ferroelectric chiral liquid crystal (FLC), or nematic cholesteric phase change (NCPT) liquid crystal. PLC and PDLC may offer better brightness than other materials. FLC may operate at smectic phase which may produce 10-100 times faster response times such as at lower voltages. NCPT may possess bistable memory under a suitable bias voltage and may be suitable for use in various applications.

The front plane is attached to the wall along a corresponding glue line 32. Glue lines 30 and 32 may be scored or patterned on the front and back planes prior to assembly, although this is not a necessity. A bonding adhesion layer 28 (FIG. 3) is then applied to enclose the front plane over the chamber, thereby forming the liquid crystal layer of the LCOS device. Like layer 18, adhesion layer 28 forms a seal at the joint between the front plane and wall. Prior to assembly of the front plane onto the wall, measures may be taken to eliminate all, or substantially all, air bubbles that may have formed within the liquid crystal material in the chamber. One such measure includes the formation of one or more openings, or holes, in the front plate surface, the back plane surface, and/or the peripheral wall. The openings or holes may serve as a repair mechanism in a manner discussed in greater detail below.

Figure 5:
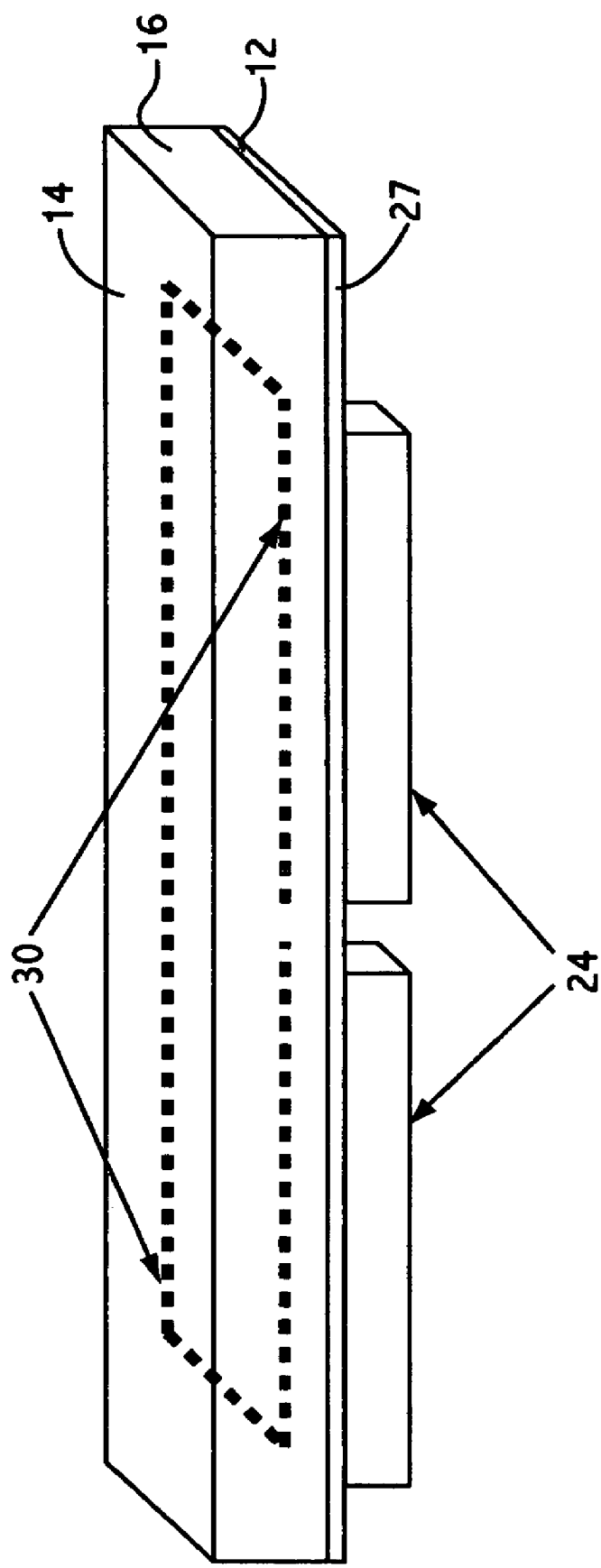
FIG. 5 is a diagram showing another view of the LCOS device in accordance with the first embodiment of the present invention.

Wire bonding, bumping, tabbing, or other silicon packaging procedures may be performed to finish assembly of the LCOS device. As shown in FIG. 5, these finishing procedures may include the formation of a layer 24 of aluminum or other material on a surface of the back plane. Like chamber wall 16, layer 24 may be coated with an anti-reflective layer (e.g., TiN) for ambient light absorption as well as for better adhesion to the silicon back plane.

In operation, a projection system having a front-side light source projects light through the front plane of the LCOS device. The light is then reflected to generate an image for projection onto a display screen. The reflectivity may be 65-85% or another value. The LCOS device may form part of a micro-display panel or may be used in combination with one or more other LCOS devices for generating larger images, for example, in a television application.

A LCOS device in accordance with a second embodiment of the present invention is similar to the first embodiment except that the cathode electrodes are formed on an interior surface of the front plane. The cathode electrodes may be formed to protrude a predetermined distance from the front plane to either contact or be spaced a predetermined distance from the back plane. To maintain alignment and stability, the protruding cathode electrodes may be uniformly distributed across the front plane interior surface in a one-to-one relationship with pixel areas and may be the same or substantially the same lengths. The electrodes may be in the shape of pillars or have other protruding forms. Also, an intervening transparent electrode (e.g., ITO) layer 29 may be formed between the cathode electrodes and the front plane, which, for example, may be made of glass or quartz. An ITO layer may 27 also be formed between aluminum layer 24 and back plane 12 as shown in FIG. 5.

Figure 6:
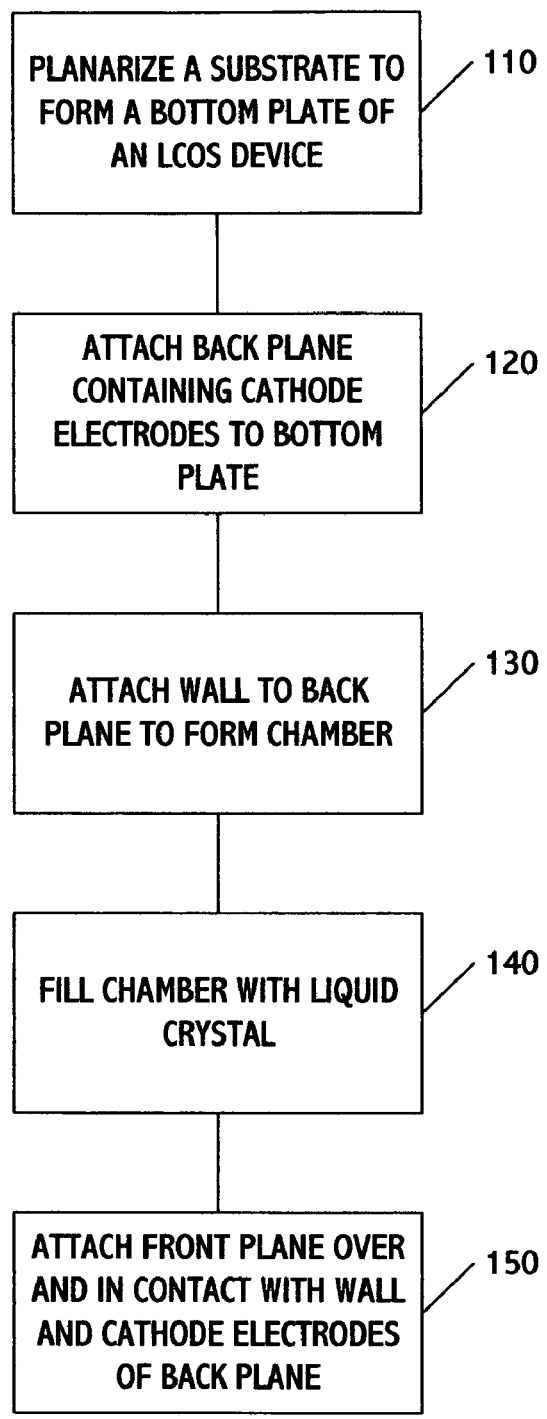
FIG. 6 is a flow chart showing functional blocks included in first embodiment of a method of assembling an LCOS device in accordance with the present invention.

A method of assembling a LCOS device in accordance with a first embodiment of the present invention may be used to form any of the embodiments shown in FIGS. 2-5. Functional blocks which may be included in the method are shown in FIG. 6 with reference to corresponding stages of assembly shown in FIGS. 7A-7F.

The method includes planarizing a ceramic substrate to form a fine grade bottom plate 201 of the LCOS device. (Block 110, FIG. 7A). The ceramic substrate may be an integrated circuit package substrate which is lapped, polished, or etched using any one of a number of techniques including but not limited to chemical-mechanical polishing (CMP).

A back plane 203 is attached to a surface of the ceramic substrate using an adhesive material such as polysilicon. (Block 120, FIG. 7B). The back plane may be made of silicon or another semiconductor material and may include circuits such as pixel drivers, anode electrodes, chip interconnects (not shown), and display frame storage circuitry. The back plane also includes cathode electrodes 205 which protrude a predetermined distance above a surface of the back plane. The cathode electrodes may be provided in one-to-one correspondence with the anode electrodes in the back plane.

As previously indicated, in accordance with at least one embodiment, the cathode electrodes may be in the shape of pillars for imparting structural stability to the assembly in addition to controlling the polarization of the liquid crystal to generate gray scale values for image generation. The pillars may have a solid or hollow core. The distance the cathode electrodes protrude above the back plane surface may be based on a particular cell gap distance for the display, a distance required between the front and back planes, and/or other factors. As previously described, the cathode electrodes may be uniformly distributed, for example, in the form of a matrix or other pattern in the back plane. In another embodiment, the cathode electrodes may be arranged in an irregular pattern.

Once the back plane has been attached to the ceramic substrate, a wall 207 is attached to the back plane. (Block 130, FIG. 7C). The wall may fully enclose the cathode electrodes along a periphery of the back plane to create a chamber 209 for holding liquid crystal to be introduced in a subsequent procedure. The height of wall 207 may be identical to or substantially the same as the protruding distance of the cathode electrodes, or may be higher or lower depending on the application.

The wall may be attached to the back plane in a multi-step, such as a two-step, process. First, a bonding adhesion layer may be applied along a glue line as shown, for example, in FIGS. 3 and 4. The adhesion layer may have a predetermined thickness (e.g., 0.3-0.5 µm) and may be made of a sealant (e.g., polyimide) to prevent leakage from the chamber. The adhesion layer may extend to either side of wall 207 and may contact one or more of the outermost cathode electrodes. The formation of the sealant surface is also shown by reference numeral 18 in the exploded view of FIG. 3.

Second, the adhesion layer is hardened or cured to form a seal at the joint between the wall and surface of the back plane. The curing may include thermal, chemical, or optical (such as ultraviolet light) processes. During the curing process, a predetermined amount of pressure (e.g., 20 psi) may be applied to the front plane. The pressure may be varied dynamically during curing to improve the quality and reliability of the seal. The wall may be made of aluminum or another material and may be formed around the cathode electrodes using, for example, a deposition/etching process. Certain interior portions of the chamber wall may be coated with an anti-reflective layer (e.g., TiN) for light absorption. Also, like the pillar cathodes, the wall may be grounded or driven based on a gray scale rendering scheme used to form images on the resulting display.

After the wall has been formed and sealed along its bottom edge, the chamber is filled with liquid crystal 211. (Block 140, FIG. 7D). In accordance with one embodiment, the chamber is filled by submerging the portions of the LCOS device assembled thus far in a bath of liquid crystal. The chamber may be filled concurrently from all edges and may be agitated during filling. Centrifugal force may be used during filling, and the liquid crystal may be heated prior to filling to reduce viscosity during filling.

When the liquid crystal has filled the chamber to a predetermined extent, the assembly may be removed. At this point, some liquid crystal may be removed to form a liquid crystal layer of a predetermined thickness, or the chamber may be left to be completely filled with the liquid crystal material. As an alternative to submersion, the chamber may be filled by injection in a vacuum environment followed by a (e.g., ultraviolet light) sealing procedure. The injection may be performed with a peristaltic pump.

After the chamber is filled with LC material, the front plane 213 of the LCOS device is attached over and in contact with the wall. (Block 150, FIG. 7E). In this position, the front plane may contact or be spaced from the cathode electrodes by a predetermined gap. The front plane may have lateral dimensions which are the same as the back plane. In other embodiments, the front plane may have different dimensions. To prevent leakage, peripheral portions of the front plane are at least substantially coincident with the wall of the chamber, or these portions may overlap the wall or back plane dimensions. The front and back planes may be made of the same material (e.g., silicon), although this is not a requirement.

The front plane may be attached to the wall in a manner similar to the way in which the wall was attached to the back plane. This may involve, for example, applying a bonding adhesion layer (which also acts as a sealant) along a glue line on the interior surface of the front plane. (See, e.g., FIGS. 3 and 5). The front plane is then lowered over the cathode electrodes until the adhesion layer contacts the wall to form a seal. In this position, the cathode electrodes may contact the interior surface of the front plane or a length of the cathode electrodes may be defined to form a predetermined gap with the front plane. In this latter case, the height of the chamber wall is larger than the protruding height of the cathode electrodes.

After the front plane is lowered to contact the wall, a curing or hardening process is performed to form a seal. This procedure may involve pre-heating the front plane to a predetermined temperature. This will improve bonding between the wall and front plane, especially when the wall is made of aluminum and the front plane is made of glass or quartz. To minimize warping, a predetermined bending moment force is applied to an edge of the front plane. This moment may be determined, for example, by the following equation:

$$-\tfrac{1}{4}t^2 \,(\tau_y-\tau_x)\Delta T \cdot (H_{xx}H_{yy}-H_{xy}^2)/(H_{xx}+2H_{xy}+H_{yy})$$

where t is the thickness of the covering material (e.g. front plane), $\tau_x$ is the thermal expansion coefficient in a first direction x, $\tau_y$ is the thermal expansion coefficient in a second direction y which is perpendicular to x, $\Delta T$ is the absolute change in temperature that occurs from the time the curing process begins to the time the curing process ends, and H is the stiff matrix of the bonding adhesion layer. The thermal expansion coefficients may relate, for example, to the material from which the front plane is made. To assist in the thermal curing process, contact pressure may be applied to the two piece of bonding material.

Prior to attachment, a coating of a transparent electrode material 215 (e.g., ITO) may be applied to an interior surface of the front plane to improve conductivity with the cathode electrodes. The transparent electrode material may contact or be spaced from the cathode electrodes.

Additional operations include performing wire bonding and silicon packaging procedures to complete assembly of the LCOS device. (Block 160).

Figure 8:
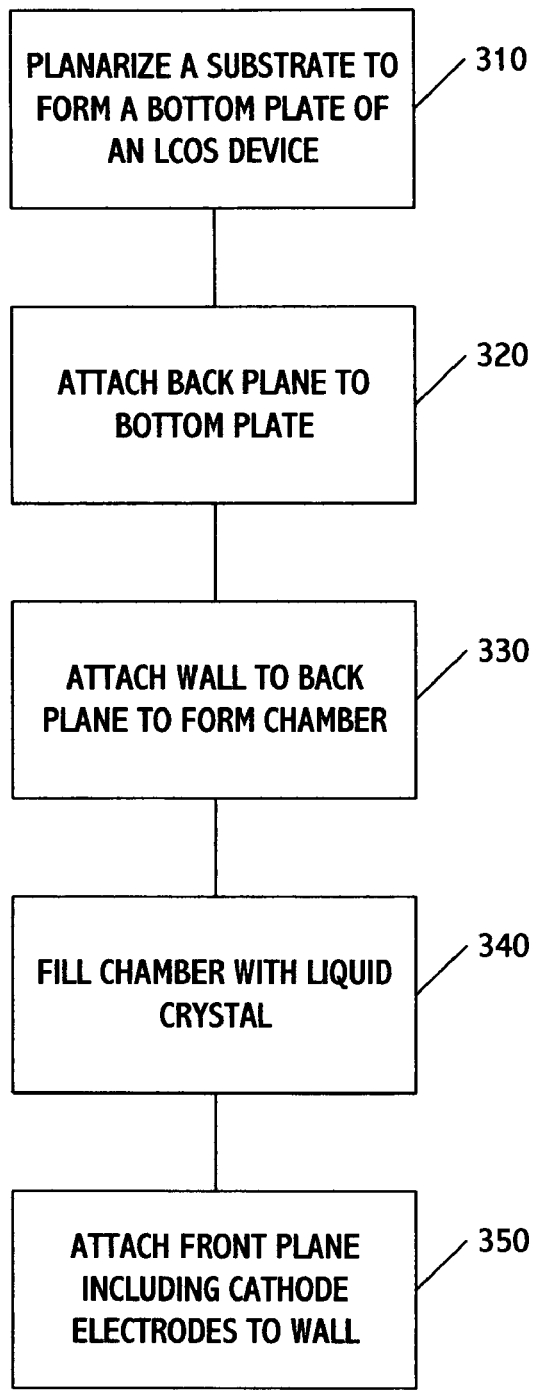
FIG. 8 is a flow chart showing functional blocks included in second embodiment of a method of assembling an LCOS device in accordance with the present invention.

A method of assembling a LCOS device in accordance with a second embodiment of the present invention includes functional blocks shown in FIG. 8 with reference to corresponding stages of assembly shown in FIGS. 9A-9F.

The method includes planarizing a ceramic substrate to form a fine grade bottom plate 401 (Block 310, FIG. 9A), and then attaching back plane 403 to a surface of the bottom plate. (Block 320, FIG. 9B). These operations may be performed in the same manner as Blocks 210 and 220 of the first embodiment, and the back plane may include the same pixel drivers and other circuits previously mentioned. However, unlike the first embodiment, an active area of the back plane does not include cathode electrodes.

Figure 7A:
FIGS. 7A-7F are diagrams showing different stages of assembly that result from the functional blocks in FIG. 6.
Figure 7B:
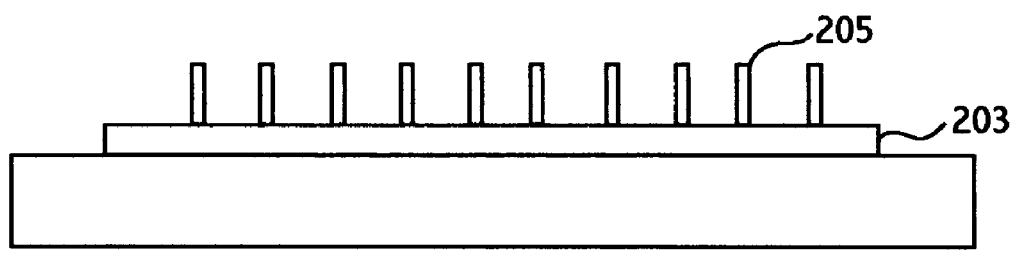
Figure 7C:
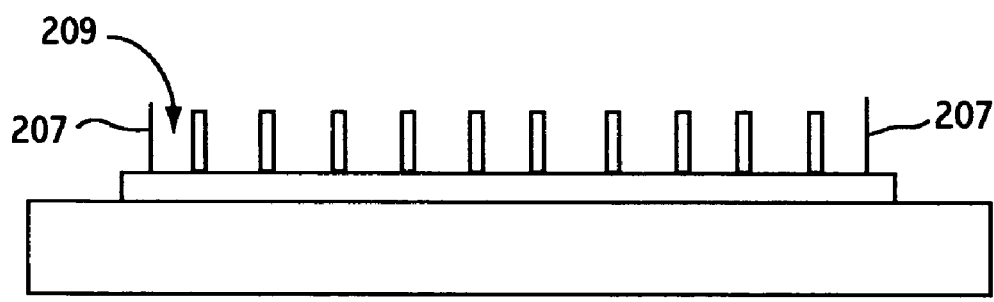
Figure 7D:
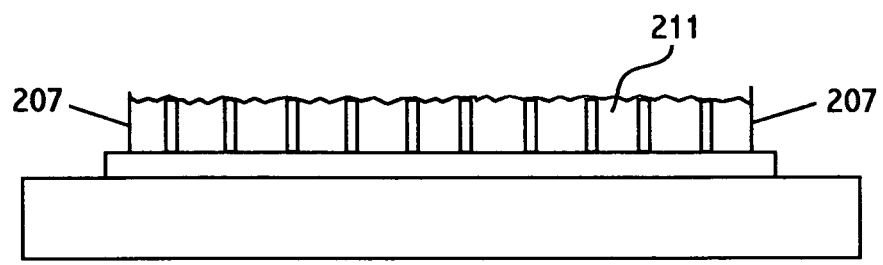

After the back plane has been attached to the bottom plate, a wall 405 is attached to the back plane in a manner similar to wall 207 in FIG. 7C, e.g., with the same sealant/adhesion layers. (Block 330, FIG. 9C). Intervening ITO layers may be attached to the LC-facing surfaces of the front and/or back planes. Attachment of wall 405 creates a chamber which is filled with liquid crystal 409 by concurrent submersion from all edges, injection with a peristaltic pump, or another technique. (Block 340, FIG. 9D) This material may be nematic liquid crystal or another kind of material.

Figure 7E:
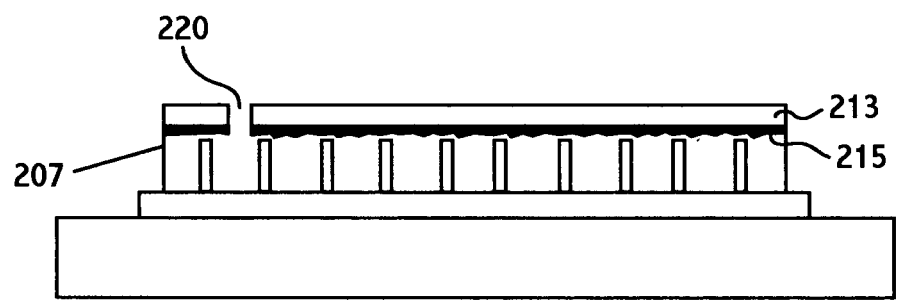

Once the chamber is entirely filled with liquid crystal or filled to a predetermined depth, a front plane 411 is attached to the wall over and in alignment with the back plane. (Block 350, FIG. 9E). The front plane may be attached to the wall in a manner similar to the way in which front plane 213 is attached to wall 207 in the first embodiment, as shown in FIG. 7E. However, unlike the first embodiment, the front plane includes a plurality of cathode electrodes 413 disposed across an interior surface in a uniform or irregular pattern. The cathode electrodes may be pillar electrodes or any of the other types of electrodes mentioned for the first embodiment, and may be formed using a semiconductor process similar to that described in connection with the first embodiment. The electrodes may contact the back plane or may have lengths which leave a predetermined cell gap therebetween. Also, the circuits for driving the front plane cathodes may be included among the integrated circuits in the back plane. Wire bonding and silicon packaging procedures are performed to complete assembly of the LCOS device.

The foregoing embodiments of the method of the present invention may include a number of optional procedures.

Figure 7F:
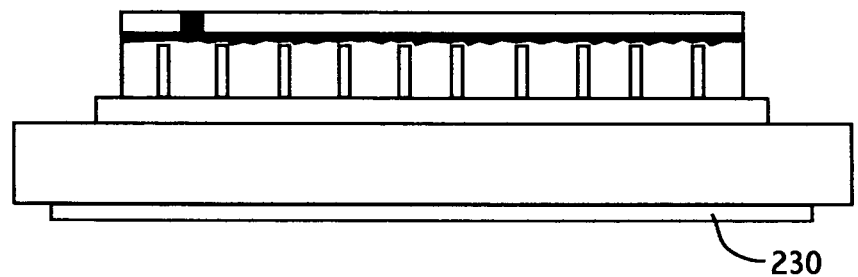
Figure 9A:
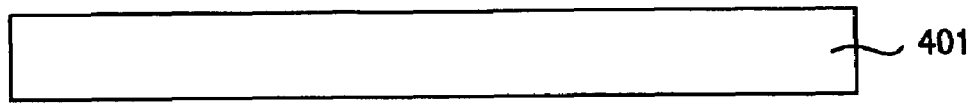
FIGS. 9A-9F are diagrams showing different stages of assembly that result from the functional blocks in FIG. 8.
Figure 9B:
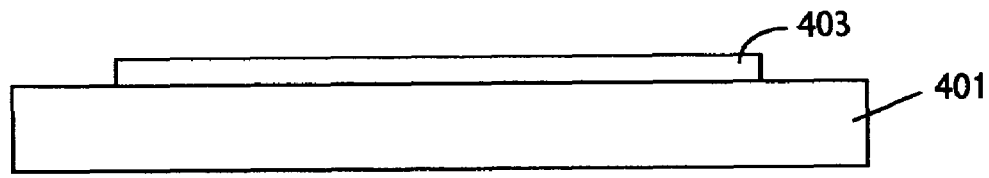
Figure 9C:
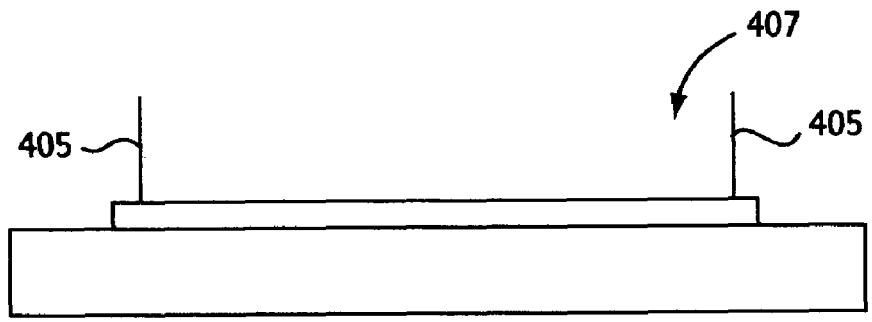
Figure 9D:
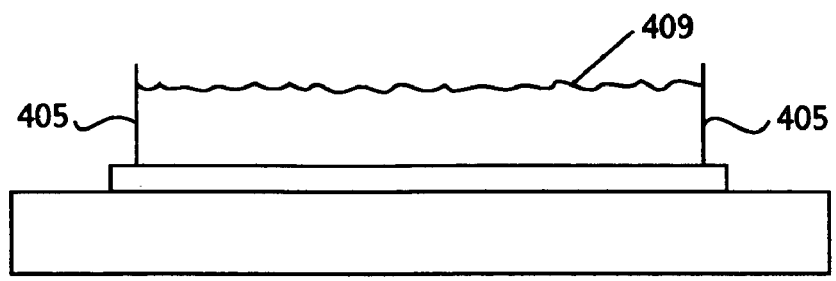
Figure 9E:
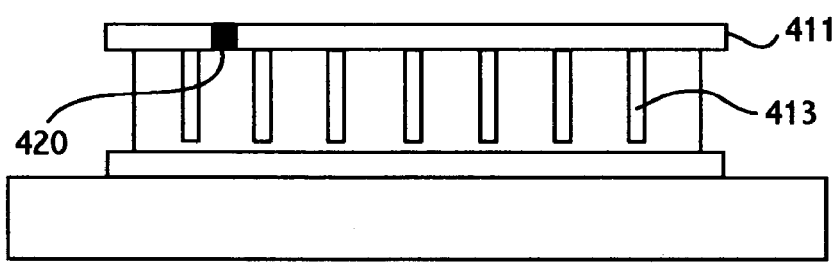
Figure 9F:
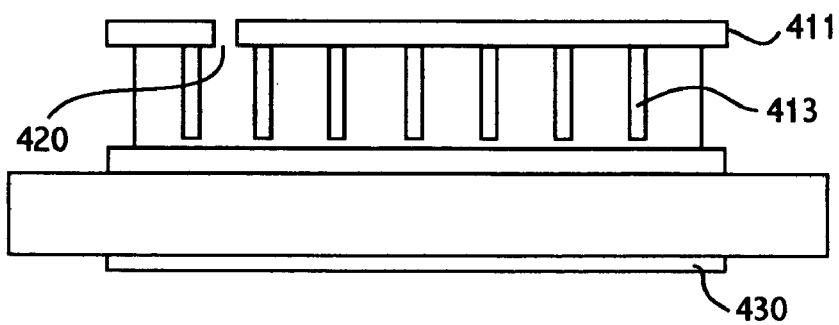

One optional procedure involves forming one or more openings or holes (220 in FIG. 7E, 420 in FIG. 9E) in the front plane before the plane is attached over the chamber. The one or more holes may also or alternatively be formed in the back plane or chamber wall. The holes may have a cross-section resembling a "plus" sign or another shape. The holes may lie outside of an active viewing area of the display and may permit liquid crystal material to be discharged as a result of pressure applied when the front plane is attached to the chamber wall. The holes may also be used for suctioning any remaining air bubbles from the chamber. The holes may also be used for re-introducing small amounts of additional LC material after suctioning to ensure that the chamber is adequately filled. The holes may be capped, such as with epoxy, after filling is completed such as shown in FIGS. 7F and 9F. If repair is needed during use of the display, the hole may be re-opened for air suction and LC re-filling as appropriate.

Another optional procedure may include forming a layer (230 in FIG. 7F, 430 in FIG. 9F) of aluminum or other material on the bottom surface of the silicon back plane. Like the coating on the chamber wall, layers 230 and 430 may include an anti-reflective layers (e.g., TiN) for providing light absorption as well as for improving adhesion of the back plane to the underlying ceramic package bottom plate.

Another optional procedure is performed during the formation of the circuits in the back plane. In forming these circuits, certain precautions may be taken such as covering the back plane by a predetermined amount (e.g., >50%) or as much as possible at all or at least the top two layers. This improves flatness and reflectance properties of the back plane.

Another optional procedure may be used to improve parallelism between the front and back planes. This procedure involves forming a number of cathode electrodes to be different from the number of pixels in the display. In one embodiment, the cathode electrodes are arranged in an irregular pattern. One or more of the embodiments of the present invention may include a large number of cathode electrodes, such as in the range of hundreds, thousands, or even millions. If the electrodes are shaped as pillars, the pillars may all have the same height but not necessarily so. In some applications, image contrast and brightness may tend to degrade along the boundary of the active area of the display. In order to improve contrast and brightness, the pillars along the device boundary (e.g., near the wall) may be varied in height (e.g., increased or decreased) to compensate for reflectance which may tend to produce a degradation in contrast.

Also, in one or more embodiments of the present invention, the anode electrodes may be used to drive the pixel values in the display and a voltage driver may be used to drive a reference voltage to the front plane. Depending on the gray scale rendering scheme, the circuit can be a simple ground holder or a level-shifting driver having a switching frequency lower than the anode electrode signaling. Alternatively, the roles of the anode and cathode electrodes may be reversed, i.e., the cathode electrodes may driver the pixel values.

In one embodiment previously discussed, a one-to-one correspondence was indicated to exist between the numbers of anode and cathode electrodes in the LCOS device. The cathode electrodes were also indicated to correspond to the pillar electrodes. In an alternative embodiment, the anode electrodes may be formed as pillars. In another embodiment, the LCOS device may be formed using a common anode electrode and cathode electrodes formed as pillars. In yet another embodiment, the device may be formed using a common cathode electrode and anode electrodes formed as pillars.

Another embodiment of the LCOS device contemplates forming pillar electrodes on the front and back planes. In this embodiment, the pillar electrodes formed on the front and back planes may be all cathode electrodes, all anode electrodes, or a combination of the two. Also, the pillar electrodes on the front planes may be formed in a complementary pattern with respect to the pillar electrodes formed on the back plane. For example, the pillar electrodes on the front plane may be disposed along a periphery of an active region of the LCOS device and the pillar electrodes on the back plane may be situated within the periphery.

Also, the pillar electrodes may be formed with different concentrations at different areas on the front or back planes. For example, a higher concentration of pillar electrodes may be formed in a central region of the device compared with the concentration of pillar electrodes on a peripheral region of the device. The concentration of pillar electrodes may therefore be formed in an irregular or non-uniform pattern in these embodiments. The differing concentrations of pillar electrodes may appear for embodiments that have pillar electrodes extending from only one of the front or back planes or from both the front and back planes.

Figure 10:
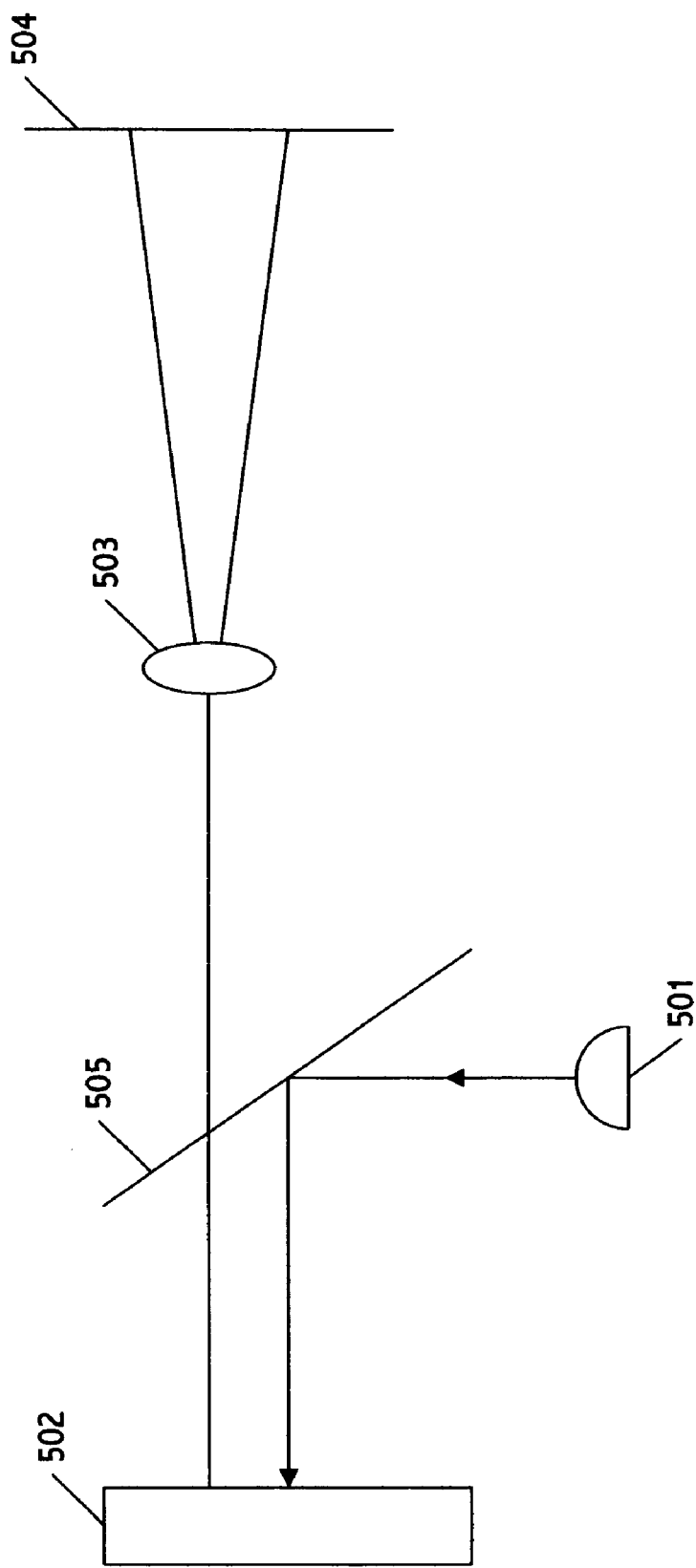
FIG. 10 is a diagram of an optical projection system that includes an LCOS device in accordance with any of the embodiments of the present invention.

FIG. 10 shows an image projection system in accordance with one embodiment of the present invention. This system includes a light source 501, a LCOS device 502, and a projection lens 503 for projecting an image on a screen 504. In operation, the light source generates light based on a received image signal. The light beam is reflected from a reflecting lens 505 and directed onto the LCOS device. The LCOS device reflects the light beam, and in so doing generates an image based on control signals input into the pixel drivers and cathode electrodes included in a back plane of the device. The image generated by the LCOS device passes through lens 505 and is projected onto the screen by the projection lens. The LCOS device may be any of the embodiments of the LCOS device of the present invention previously described.

Figure 11:
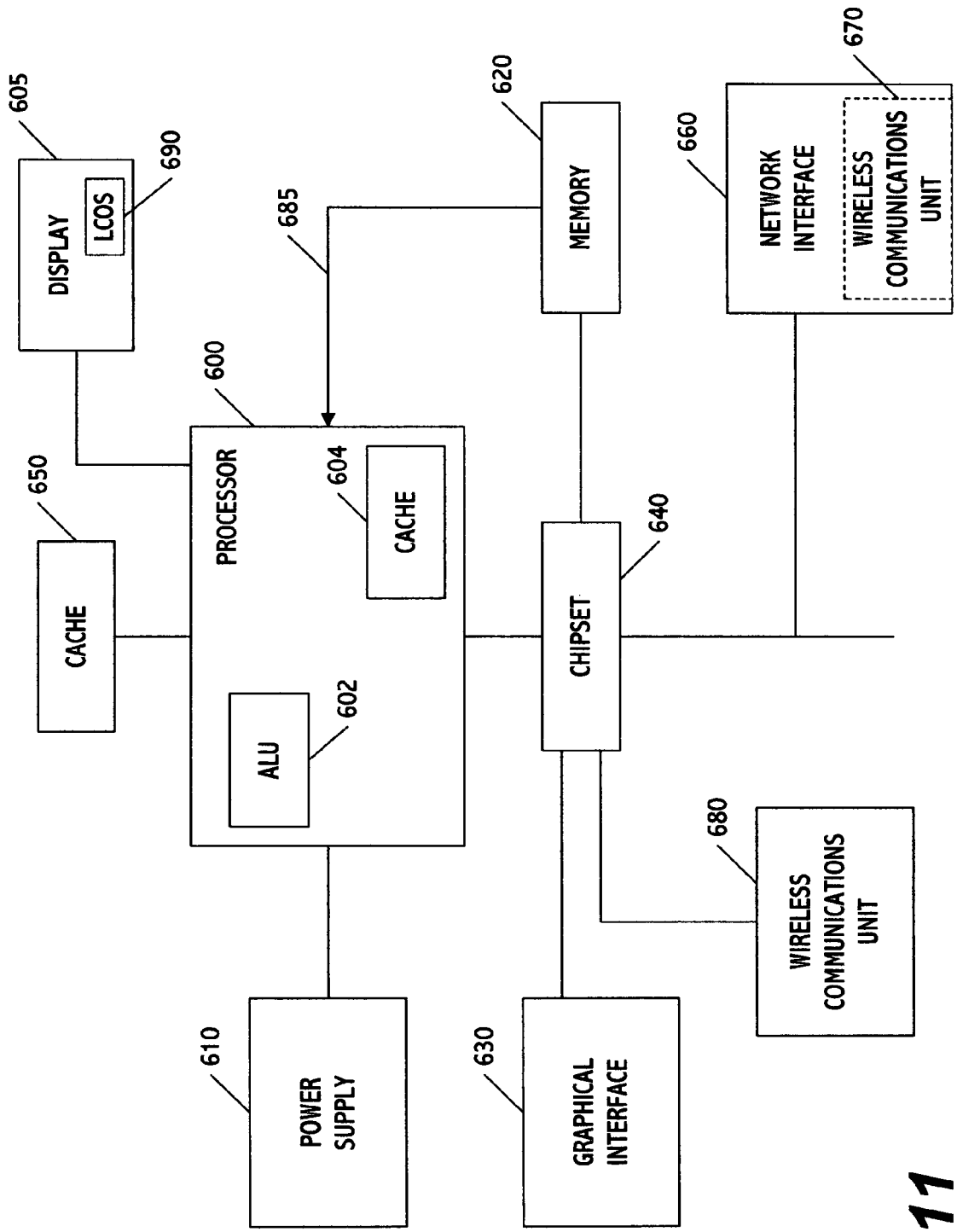
FIG. 11 is a diagram showing a processing system that includes a LCOS device in accordance with any of the embodiments of the present invention.

FIG. 11 shows a system which includes a processor 600, a display 605, a power supply 610, and a memory 620 which, for example, may be a random-access memory. The processor includes an arithmetic logic unit 602 and an internal cache 604. The system may also include a graphical interface 630, a chipset 640, a cache 650, a network interface 660, and a wireless communications unit 670, which may be incorporated within the network interface. Alternatively, or additionally, the communications unit 680 may be coupled to the processor, and a direct connection 685 may exist between memory 620 and the processor as well.

The display includes a LCOS device 690 in accordance with any of the embodiments described herein. The LCOS device generates images for projection on a screen of the display based on control signals from the processor. The control signals are received by the pixel driver circuit in the LCOS device to control activation of the cathode electrodes to generate the displayed image.

The processor may be a microprocessor or any other type of processor, and may be included on a chip die with all or any combination of the remaining features except for the LCOS and display, or one or more of the remaining features may be electrically coupled to the microprocessor die through known connections and interfaces. Also, the connections that are shown are merely illustrative, as other connections between or among the elements depicted may exist depending, for example, on chip platform, functionality, or application requirements.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A liquid-crystal-on-silicon device, comprising:
   a front plane;
   a back plane disposed adjacent to the front plane;
   a chamber disposed between the front plane and the back plane;
   a wall disposed around the chamber;
   an anti-reflective coating disposed on interior portions of the wall;
   liquid crystal disposed within the chamber;
   a pixel driving circuit disposed in the back plane;
   a control circuit for the liquid crystal disposed in the back plane; and
   a plurality of electrodes protruding into the chamber, wherein the electrodes serve as spacers and define a cell gap between the front and back planes and wherein the liquid crystal in the chamber is to assume different polarization states at respective pixel sites to form an image based on different values of electrical signals to be applied to the electrodes.

2. The device of claim 1, wherein the electrodes protrude from the back plane into the chamber.

3. The device of claim 1, wherein the electrodes protrude from the front plane into the chamber.

4. The device of claim 1, wherein the electrodes protrude from the front plane and the back plane.

5. The device of claim 4, wherein the electrodes protrude from the front plane into the chamber in a first pattern and protrude from the back plane into the chamber in a second pattern complementary to the first pattern.

6. The device of claim 1, wherein the electrodes are distributed in an irregular pattern within the chamber.

7. The device of claim 1, wherein the electrodes have a pillar shape.

8. The device of claim 7, wherein the electrodes have a hollow core.

9. The device of claim 7, wherein each of the electrodes has a length that substantially corresponds to the height of the wall and the cell gap, and wherein the electrodes contact the front and back planes and maintain the planes substantially parallel to one another.

10. The device of claim 7, wherein the electrodes contact the front and back planes and maintain stability within the device.

11. The device of claim 1, wherein the electrodes have substantially a same length shorter than a height of the wall and a height of the chamber, so as to form a predetermined gap between the electrodes and one of the front and back planes.

12. The device of claim 1, wherein the electrodes are cathode electrodes disposed in opposing relation to at least one anode electrode.

13. The device of claim 1, wherein the electrodes are anode electrodes disposed in opposing relation to at least one cathode electrode.

14. The device of claim 1, further comprising:
a repair mechanism disposed in the front plane.

15. The device of claim 14, wherein the repair mechanism includes one or more holes to reduce an amount of air in the chamber or to allow additional liquid crystal to be introduced into the chamber, wherein the holes are capped after the filing is completed.

16. A method for assembling a LCOS device, comprising:
attaching a first surface of a back plane to a bottom plate;
attaching a wall to a second surface of the back plane to form a chamber;
forming an anti-reflective coating on interior portions of the wall;
forming a plurality of electrodes protruding into the chamber;
filling the chamber with liquid crystal;
attaching a front plane over the wall to enclose, the chamber; and
repairing the device by air suction and re-filling the chamber with liquid crystal through holes in the front plane, wherein the holes are re-opened and capped after the chamber is filled with liquid crystal, said method further comprising:
coupling the electrodes to a pixel driving circuit that is to apply different values of electrical signals to the electrodes, the different values of the electrical signals causing the liquid crystal in the chamber to assume different polarization states at respective pixel sites to form an image.

17. The method of claim 16, wherein the electrodes have substantially a same length shorter than a height of the wall and a height of the chamber, so as to form a predetermined gap between the electrodes and the front plane or the back plane.

18. The method of claim 16, wherein each of the electrodes has a length that substantially corresponds to the height of the wall and the cell gap, and wherein the electrodes contact the front plane and back plane and increase parallelism between the front and back planes.

19. The method of claim 16, wherein the electrodes have a pillar shape.

20. The method of claim 19, wherein the electrodes extend into the chamber from the front and back planes in complementary patterns.

21. The method of claim 16, wherein attaching the wall includes:
applying a first bonding adhesion layer to the second surface of the back plane;
placing the wall on the first bonding adhesion layer; and
curing the first bonding adhesion layer to form a seal at a joint between the wall and second surface of the back plane.

22. The method of claim 21, wherein attaching the front plane includes:
applying a second bonding adhesion layer to the front plane;
placing the wall into contact with the second bonding adhesion layer; and
curing the second bonding adhesion layer to form a seal at a joint between the wall and the front plane, thereby closing off the chamber.

23. The method of claim 22, wherein the first and second bonding adhesion layers include at least one of polysilicon or polyimide.

24. The method of claim 16, wherein said filling includes:
submerging the wall in a bath of liquid crystal to fill the chamber concurrently from all edges to a predetermined height.

25. The method of claim 24, further comprising:
agitating the chamber during or after submersion of the wall in the liquid crystal.

26. The method of claim 16, further comprising:
forming a repair mechanism in the front plane to reduce an amount of air in the chamber or to allow additional liquid crystal to be introduced into the chamber.

27. A system comprising:
a LCOS device including:
(a) a front plane,
(b) a back plane adjacent to the front plane and including a pixel driving circuit,
(c) a wall enclosing a chamber between the front plane and back plane, and
(d) a plurality of electrodes protruding into the chamber, the chamber filled with liquid crystal that assumes different polarization states at different pixel sites to form an image based on electrical signals applied to the electrodes, wherein the electrodes serve as spacers and define a cell gap between the front plane and the back plane; and
a projection lens to project the image onto a screen, wherein the liquid crystal in the chamber is to assume different polarization states at respective pixel sites to form an image based on different values of electrical signals to be applied to the electrodes.

28. The system of claim 27, wherein the electrodes have a pillar shape with a hollow core and are arranged in an irregular pattern in the chamber.

29. The system of claim 27, wherein the electrodes protrude from the back plane into the chamber.

30. The system of claim 27, wherein the electrodes protrude from the front plane into the chamber.

31. The system of claim 27, wherein each of the electrodes has a length that substantially corresponds to the height of the wall and the cell gap, and wherein the electrodes contact the front and back planes to provide a mechanical force that maintains the planes substantially parallel to one another.

32. A liquid-crystal-on-silicon device, comprising: a front plane; a back plane disposed adjacent to the front plane; a wall enclosing a chamber between the front plane and the back plane; liquid crystal disposed within the chamber; an anti-reflective coating disposed on interior portions of the wall and in the chamber; one or more capped holes in the front plane, wherein the capped holes comprise a repair mechanism; and electrodes disposed irregularly within the chamber, the electrodes having a pillar shape and a hollow core, wherein a first pattern of the electrodes protrude from the front plane into the chamber and a second pattern of electrodes protrude from the back plane into the chamber, and wherein the liquid crystal in the chamber is to assume different polarization states at respective pixel sites to form an image based on different values of electrical signals to be applied to the electrodes.

33. The liquid-crystal-on-silicon device of claim 32, wherein the electrodes vary in height.

34. The liquid-crystal-on-silicon device of claim 32, wherein the electrodes vary in height near the wall.

35. The liquid-crystal-on-silicon device of claim 32, wherein the one or more capped holes lie outside of an active viewing area of the liquid-crystal-on-silicon device.

36. The liquid-crystal-on-silicon device of claim 32, wherein the one or more capped holes have a cross-section resembling a "plus" sign.

37. The liquid-crystal-on-silicon device of claim 32, wherein the front plane and the back plane have different lateral dimension.

38. The liquid-crystal-on-silicon device of claim 32, wherein the front plane and the back plane are made of the same material.

39. The liquid-crystal-on-silicon device of claim 32, wherein the numbers of electrodes and pixels are different.

40. The device of claim 1, wherein only one of said plurality of electrodes is provided for each pixel site.

* * * * *

UNITED STATES PATENT AND TRADEMARK OFFICE
CERTIFICATE OF CORRECTION

| | | |
|---|---|---|
| PATENT NO. | : 7,576,815 B2 | Page 1 of 1 |
| APPLICATION NO. | : 11/482906 | |
| DATED | : August 18, 2009 | |
| INVENTOR(S) | : Jin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 159 days.

Signed and Sealed this

Seventh Day of September, 2010

David J. Kappos
*Director of the United States Patent and Trademark Office*